UNITED STATES PATENT OFFICE.

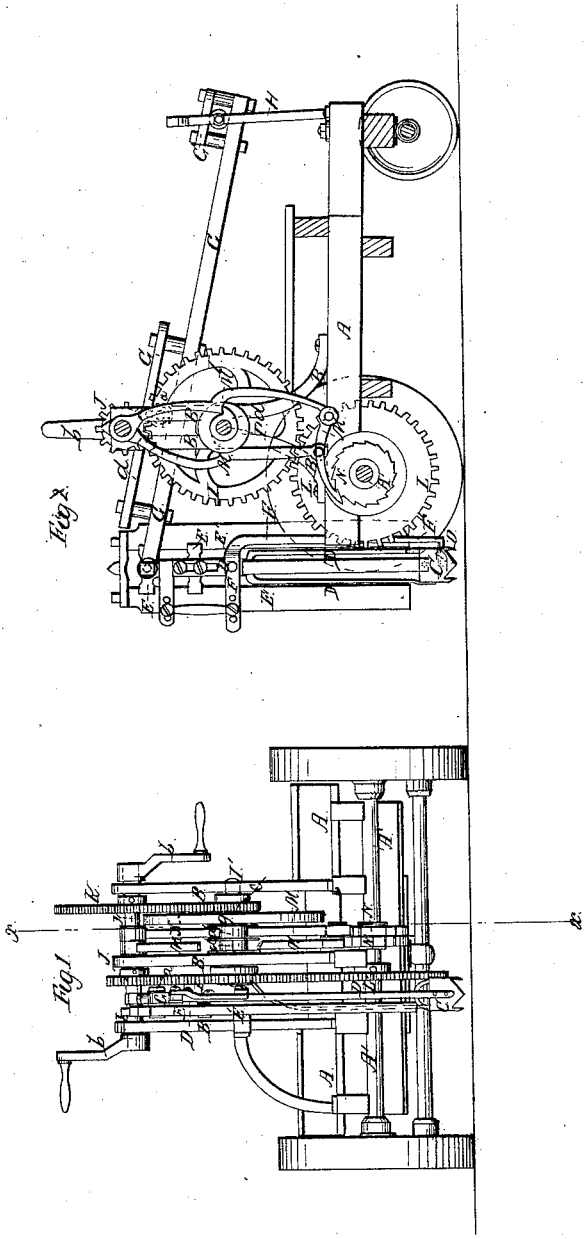

MARK B. TRUE, OF NEWBURYPORT, MASSACHUSETTS.

EXCAVATING-MACHINE.

Specification of Letters Patent No. 30,098, dated September 18, 1860.

*To all whom it may concern:*

Be it known that I, MARK B. TRUE, of Newburyport, in the county of Essex and State of Massachusetts, have invented a new and useful Improvement in Machines for Making Drains; and I do hereby declare that the following is a full, clear, and exact description thereof, reference being had to the accompanying drawings, forming a part of this specification, in which—

Figure 1, represents an end view of the machine, showing the several parts in their respective relations to each other, when the machine is not in operation. Fig. 2, is a longitudinal vertical section taken through Fig. 1, and indicated by the red line $x$, $x$, marked thereon. In this figure the parts operating to form the ditch are shown in two positions.

Similar letters of reference indicate corresponding parts in both figures.

The object of this invention is to furnish a better means of operating the shovel and hollow cutter of J. W. Morrell's ditching machine, patented May 10, 1853.

To enable those skilled in the art to fully understand my invention, I will proceed to describe its construction, and operation.

A, represents the carriage which has four wheels, the front wheels are capable of being moved around for guiding the machine in drawing it about from place to place. On the frame of this carriage are erected three uprights B, B, B, which support the shafts of the major portion of the wheel-work for operating the cutter-box C, with its shovel D. The cutter-box and shovel are placed in rear of the machine, and consist of a three-sided box, of any suitable size, with the top, bottom, and front sides open, which is attached to the lower end of a bifurcated bar D, that is placed in a perpendicular position, and attached to a reciprocating head block E, by suitable screws that pass through a slot in the top of the bar D, which allow the bar to rise up and down the length of the slot. The shovel is attached at right angles to a vibrating lever F, which is actuated by the cutter when it strikes the surface of the ground, so as to be thrown out to allow the cutter to descend and be filled with earth, then when the cutter starts to rise, the shovel will be suddenly thrown under it, and retain the earth in it, in the manner described in the machine of Patent No. 9,709.

The head-block E, that carries the cutting and shoveling apparatus, is moved up and down in V-guides E', E', which guides are secured to suitable brace rods, that connect them to the frame of the carriage so that the parts will all be securely and substantially fixed to the carriage frame.

G, is a slotted lever that is pivoted to one side of the head block E, at one end, and passes to the front end of the machine, and is hung at this end in a standard H, in such a manner by a friction roller and slot, that the lever is allowed to vibrate, and at the same time to have end play, so that from the vibrating motion given to this lever, a reciprocating rectilinear motion may be obtained of the head-block E. This lever G, is operated by an eccentric connection with a spur wheel I, on shaft I'. A grooved roller $a$, that projects from this wheel I, passes through the slot in the lever G, and as the wheel I, is rotated, the lever is alternately raised and depressed. The roller $a$ may be brought nearer to the axis of shaft I, so as to diminish its throw, and thus shorten the movement of the cutter and shovel, thereby forming a shallower drain.

The spur-wheel I, is driven by a pinion gear J, on the main crank-shaft J', which has two cranks $b$, $b$, that are operated by manual power. K, is a large spur wheel that engages with a pinion $c$, (Fig. 1) which is fixed to a balance wheel $g$, both pinion and balance wheel are loose upon the shaft I'. On the hind axle shaft A' is placed a spur wheel L, that may be keyed to the axle or not as occasion requires it, but when this wheel L, is keyed to the axle shaft, the parts operating the cutters should be thrown out of gear, as the object of this wheel is to move the machine about from place to place. In order to move the cutter up to or from the work, I place on the axle-shaft two ratchet wheels N, N, the teeth of which run in opposite directions, and in either one or the other of these wheels, are placed pawls M, M, which are operated by cams $d$, $d$, on shaft I', so as to give an advancing or receding motion to the carriage. The pawls are hung from shaft J', as clearly shown in the drawings. The cams $d, d$, are adjusted in such a relation to the cutter box, as to move the machine when this box is out of the ground.

Having thus described my invention, what I claim, and desire to secure by Letters Patent, is—

1. The arrangement of the slotted pivoted lever G, and adjustable roller $a$, with driving shaft I', wheel I, head block E, cutter box C, and shovel D, in the manner and for the purposes herein set forth and described.

2. The arrangement of the ratchet N N, shaft A, pawls M M, with the shaft J', and cams $d, d$, in the manner and for the purposes herein set forth and described.

MARK B. TRUE.

Witnesses:
TRUE CHOATE,
HORACE N. JACKMAN.